United States Patent [19]

Kenny et al.

[11] Patent Number: 5,954,819
[45] Date of Patent: *Sep. 21, 1999

[54] POWER CONSERVATION METHOD AND APPARATUS ACTIVATED BY DETECTING PROGRAMMABLE SIGNALS INDICATIVE OF SYSTEM INACTIVITY AND EXCLUDING PREFETCHED SIGNALS

[75] Inventors: John D. Kenny, Sunnyvale; Kenneth Ma, Cupertino; Vimi Pandey, Santa Clara, all of Calif.

[73] Assignee: National Semiconductor Corporation, Santa Clara, Calif.

[ * ] Notice: This patent is subject to a terminal disclaimer.

[21] Appl. No.: 08/649,557

[22] Filed: May 17, 1996

[51] Int. Cl.$^6$ ........................................................ G06F 1/00
[52] U.S. Cl. ............................................ 713/322; 713/320
[58] Field of Search .................................. 395/750, 580, 395/584, 586, 588; 364/707

[56] References Cited

U.S. PATENT DOCUMENTS

| | | | |
|---|---|---|---|
| 4,709,324 | 11/1987 | Kloker . | |
| 5,142,684 | 8/1992 | Perry et al. . | |
| 5,222,239 | 6/1993 | Rosch | 395/750 |
| 5,241,680 | 8/1993 | Cole et al. . | |
| 5,301,275 | 4/1994 | Vanbushkirk et al. . | |
| 5,396,635 | 3/1995 | Fung . | |
| 5,414,860 | 5/1995 | Canova, Jr. et al. . | |
| 5,428,252 | 6/1995 | Walker et al. . | |
| 5,440,747 | 8/1995 | Kiuchi . | |
| 5,475,848 | 12/1995 | Ikeda | 395/750 |
| 5,511,203 | 4/1996 | Wisor et al. | 395/750 |
| 5,546,037 | 8/1996 | Kenny et al. | 327/230 |
| 5,590,342 | 12/1996 | Marisetty | 395/750 |

FOREIGN PATENT DOCUMENTS 0 656 579 A2  6/1995  European Pat. Off. .

OTHER PUBLICATIONS

PICO/POWER A Cirrus Logic Division, VESUVIUS–LS, Pentium Processor PCI System Controller, Preliminary Data Book, Version 0.7, Sep., 1995.

Cirrus Logic, Inc.; VESUVIUS–LS Advanced Data Book Version 0.6; Mar. 1995; pp. 54–67.

Shanley and Anderson; ISA System Architecture; pp. 331–366; MindShare, Inc.; 1991 and 1993.

"Pico Power VESUVIUS–LS Preliminary Data Book", National Semiconductor, version 1.0, pp. i–xii, 1–32–1–34, 1–60–1–77, 1–130–1–210, 3–320, 3–337–3–343, Mar. 1996.

*Primary Examiner*—Ayaz R. Sheikh
*Assistant Examiner*—Jigar Pancholi
*Attorney, Agent, or Firm*—Limbach & Limbach, L.L.P.

[57] ABSTRACT

A method and apparatus is disclosed for controlling the application of a clock stopping signal in a processor to limit power consumption. The system controller receives addresses, signals indicative of primary and secondary system activity, and at least one nap timeout signal. Addresses are compared with programmed addresses. Matching addresses trigger a nap mode. Upon nap mode triggering, the clock stopping signal may be applied during a throttling period. Applying the clock stopping signal with programmable duty cycle during the throttling period ensures that processing necessary for the detection and servicing of primary and secondary activity can occur. A prefetch detect circuit ensures that programmed addresses loaded in the middle of a prefetch do not trigger the clock stopping signal. The clock stopping signal is removed or inhibited when primary or secondary activity is detected or when nap mode is terminated by timeout.

23 Claims, 8 Drawing Sheets

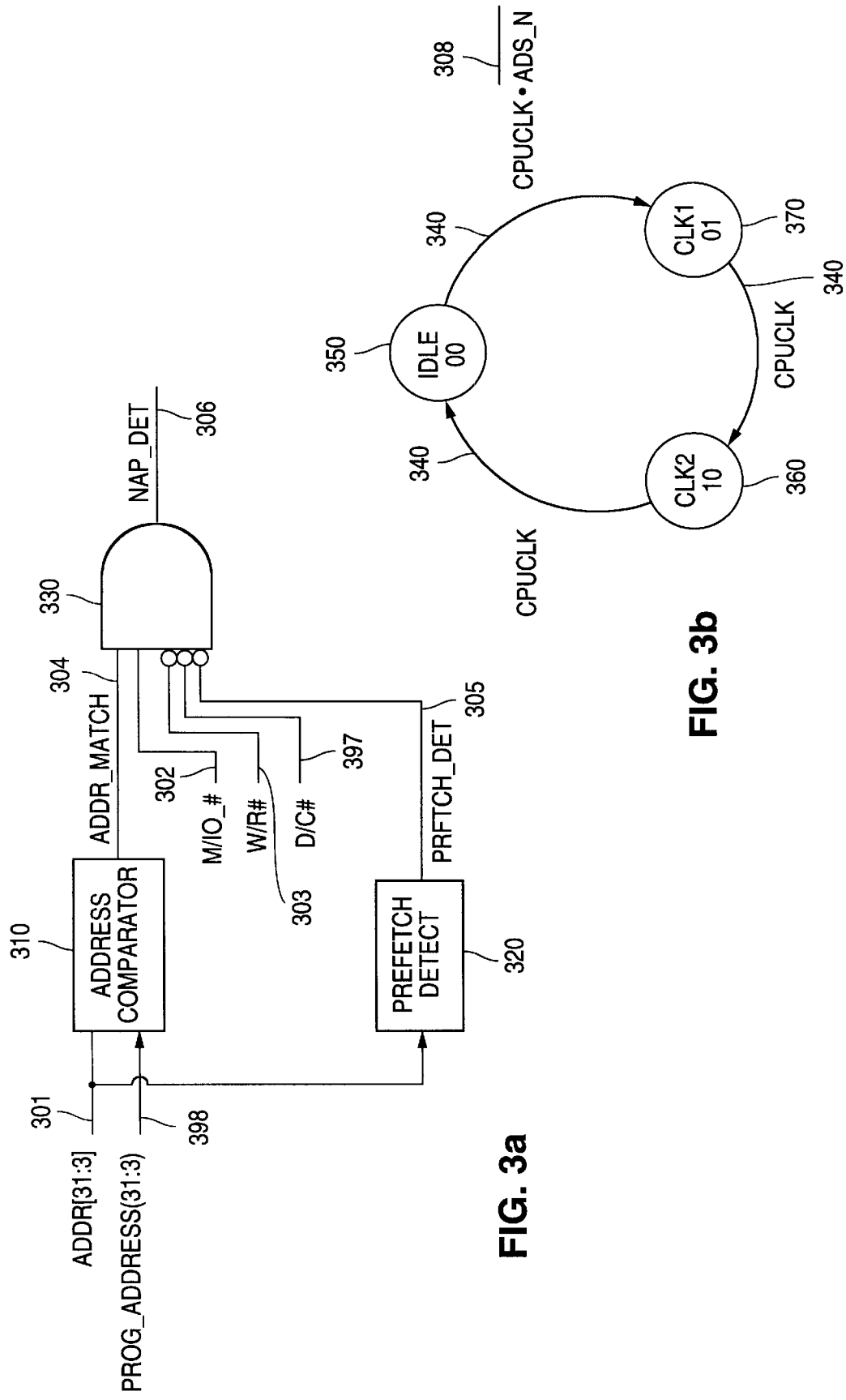

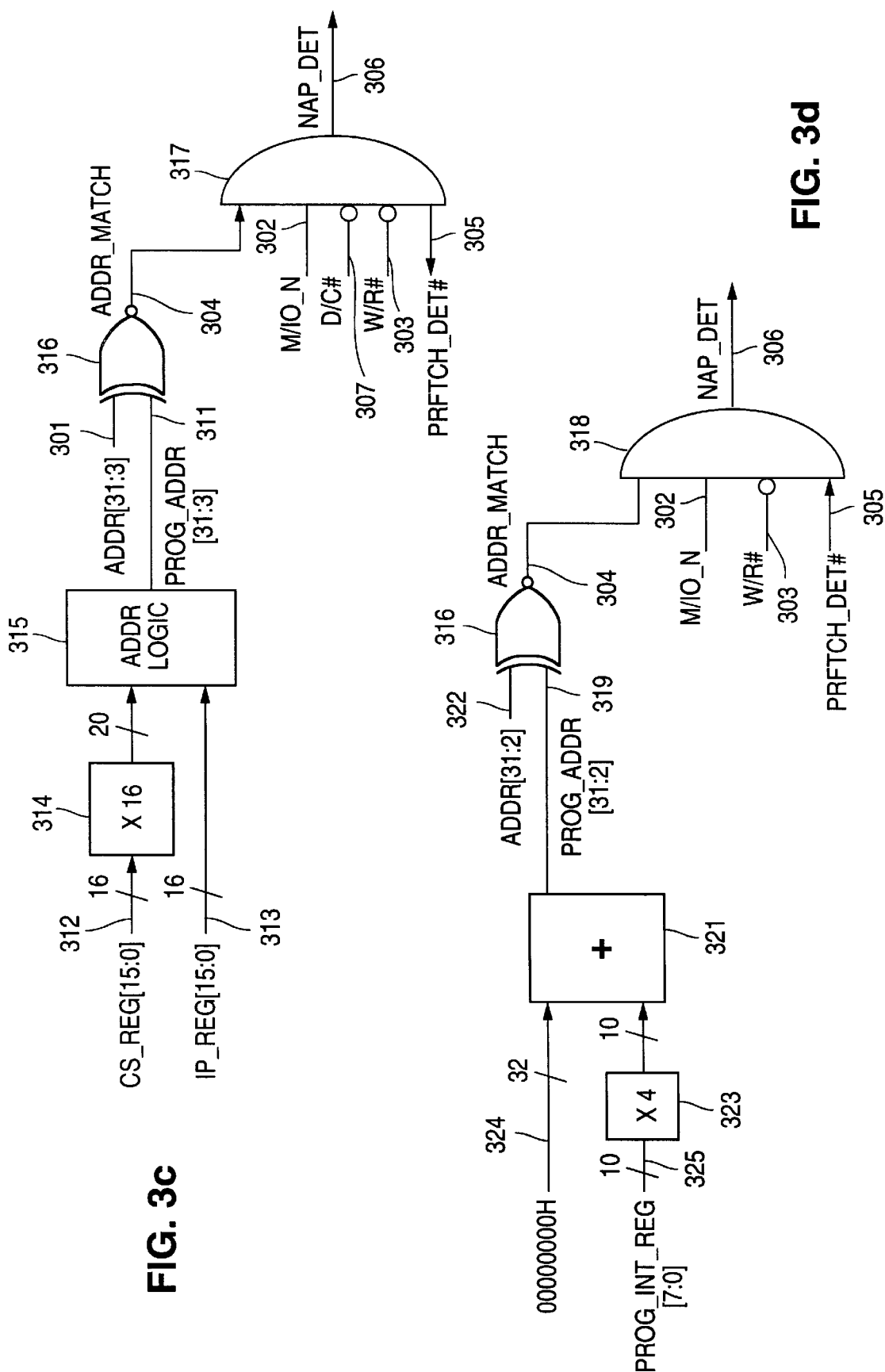

POWER CONSERVATION METHOD AND APPARATUS ACTIVATED BY DETECTING PROGRAMMABLE SIGNALS INDICATIVE OF SYSTEM INACTIVITY AND EXCLUDING PREFETCHED SIGNALS

FIELD OF THE INVENTION

The present invention relates to personal computer power conservation and management and relates to a method and apparatus for controlling application of a clock stopping signal to a processor to conserve power.

BACKGROUND OF THE INVENTION

Proliferation of portable personal computers and increasing public awareness of practical and environmental issues related to energy conservation may create a demand to conserve power in computing devices. For portable computers, thermal management and battery longevity concerns drive power conservation efforts. In desktop computing devices, power conservation relates to conserving natural resources in keeping with government and industry standards such as the EPA's EnergyStar standard.

Portable computers may only be useful if battery life supports a reasonable period of use between charges. Sufficient periods of time may be necessary to allow users to complete lengthy tasks or series of tasks. Modem portable computer batteries, even when rated for eight hours of use, may have lives of only about two or three hours between charges when continuously running CPU intensive tasks. Additional concerns regarding thermal runaway may be compounded in a high clock speed environment during extended periods of heavy processing loads.

Clock speed is known in the art to have a direct relationship to power consumption. Lee, et al., U.S. Pat. No. 5,254,888, issued on Oct. 19, 1993 and incorporated herein by reference discloses an Intel 486 CPU operating at 33 Mhz may dissipate about 4 watts of power. Lee, et al. discloses a technique for saving power by slowing the clock during wait states. However, the technique disclosed in Lee does not appear to accomplish selective application of a clock stopping signal within programmed intervals while the system may be in one of several power conservation modes.

Modern operating environments such as Microsoft® Windows® with graphical user interfaces (GUI), even when idle, may require more processing from the CPU than non-GUI based operating systems. Thus, a portable computer which is running a GUI based operating system may experience shorter battery life when idle than its idle non-GUI counter part. Other system components such as displays, disk drives, and keyboards consume system power when accessing processor resources. Reducing power consumed by these system components while maintaining the ability to monitor their activity and provide them with processing resources without delay may be desirable.

Prior art power conservation methods such as sleep modes which disable the processor more completely, may have the disadvantage of long wake-up latencies. Service to system peripherals may not be possible until full processor wake-up. Providing system peripherals with faster access to processor service may shorten wake-up latency. Shortening wake-up latency may translate to more tolerable wait times for the user as the system wakes up. Moreover, some processing requests may be serviced in the background without requiring full wake-up. By making it possible for some activity to be processed during sleep modes, a wider array of activity may be available to trigger wake-up.

Interrupts are known in the art and may be generated when system activity is present either from user input or from peripherals which require processor service. Peripheral devices may request service from a processor through an interrupt request. Interrupt requests may be serviced through the execution of an Interrupt Service Routine (ISR). When an interrupt occurs, the processor stops executing a present program and begins executing the ISR as discussed in Chapter 18, pp 331–366, *ISA System Architecture,* Shanley and Anderson, MindShare Press, 1991, 1993, incorporated herein by reference. The processor may respond to an interrupt request and determine which device or software process initiated the request by obtaining the associated interrupt number. Once the identity of the interrupt is determined by interrupt number, the address of the ISR may be found from the interrupt vector table (IVT) and the ISR executed. When the ISR is finished executing, execution may resume at the location stored when the processor was interrupted.

Interrupts may be generated from system activity related to keyboard input, disk drive access, peripheral access, and other system events. Conversely, other interrupts may be indicative of system inactivity. ISRs for software interrupts may be programmed into BIOS ROM and loaded into corresponding interrupt number entries in the IVT at startup. The IVT may reside in the real mode address space 00000H to 003FFH. In protected mode, the IVT can be relocated anywhere in memory. Interrupt hooking, or substitution of a custom ISR located at a different memory address for a standard BIOS interrupt handler may be common. An application or operating system software may hook the interrupt or insert the address of a custom routine in the interrupt vector table.

Common DOS fixed software interrupt INT16H, for example, is well known. Interrupt INT16H, known as the Keyboard Services interrupt is described in *The Programmer's PC Sourcebook,* 2nd Ed., Tom Hogan, Microsoft Press, 1991, incorporated herein by reference. When there is no input from a user, DOS may loop on INT16H looking for keyboard activity. Detecting such system looping on INT16H in itself may be used to trigger sleep modes. Subsequent activity may trigger a system to wake up. However, as described earlier, an often prolonged period must be endured for the system to wake-up in order to begin or resume a task. Then, when processing is restored, all processing resources may be available.

Such an approach may be inefficient since a demand for immediate processing may be present once wake-up activity is detected by the wake-up event itself. Other system events or activity may demand immediate processing but for a short period of time, while still other system events or activity may call for processing of a background nature. Moreover, there may be small intervals between events too small to activate sleep modes but susceptible to being used to achieve a power savings. During such relatively short time intervals where full processor resources may be available, there may not be a corresponding need for processing.

SUMMARY OF THE INVENTION

To overcome the limitations of the prior art, the present invention is embodied in a system controller disposed within a computer system which receives signals including address signals, signals indicative of primary and secondary activity, and at least one nap timeout signal. Addresses which match programmed nap triggering addresses trigger the generation of a nap signal. The nap signal may be applied to a stop clock state machine which generates a clock stopping signal. The clock stopping signal is applied to the processor to suspend processing. A plurality of mode timers determine when the computer system may be advanced to a progressively lower power mode. Any primary or secondary activity may be applied to the logic circuit resulting in the de-assertion of the nap signal in one of at least two modes. De-assertion of the nap signal results in the clock stopping signal being removed. Full speed processing resumes upon removal of the clock stopping signal in certain instances.

In the preferred embodiment of the present invention, a prefetch detect circuit may generate a prefetch detect signal if the present address decoded from the bus is offset by one from the previous address stored in a register. When prefetching, the processor may read a predetermined amount of information from contiguous, sequential locations in memory. Sequential memory locations may have the characteristic of being addressed with values one greater than the previous address. Such an intrinsic characteristic may be an indication that the processor is prefetching rather than executing.

Information accessed during prefetch may be called a prefetch line. The length of a prefetch line may vary arbitrarily and may be subject to addressing limitations. In the present embodiment the prefetch line may be thirty-two bytes. If an interrupt address match is found within the first eight bytes of a prefetch line, as determined by its presence within the prefetch detect circuit as either the present address or the previous address, a prefetch detect signal may be generated. As each new address appears on the address bus, the present address may be stored in a register and may become the previous address for comparison purposes during the next cycle. When the present address is equal to the previous address plus one, a prefetch detect signal may be generated and applied to a logic circuit which inhibits the generation of the nap signal. Interrupt addresses within a prefetched line may be prevented from asserting the nap signal during prefetches and degrading performance through false nap triggering.

Also within the preferred embodiment, a throttling circuit, which may be selectively enabled, controls the application of the clock stopping signal during a throttling period. A value corresponding to the duration of a throttling period may be stored in a register coupled to the throttling circuit. The clock stopping signal of a particular duty cycle may be applied during the throttling period. A value corresponding to the percent duty cycle of the clock stopping signal may be stored in another register also coupled to the throttling circuit. The clock stopping signal may also be applied continuously if throttling is disabled.

As described, interrupts may be generated when system activity is present either from user input or from peripherals which require processor service. Typical system activity may be characterized in the present invention as primary and secondary activity. Primary or secondary activity may occur during the throttling period. The occurrence of primary activity may cause the system to return to a fully-on mode. Secondary activity may cause the activity to be serviced and the system to return to the previous power conservation mode upon completion of service. Applying the clock stopping signal in a periodic manner during throttling ensures that detection of such primary and secondary activity may not be degraded. A plurality of power conservation modes allow a system to return instantly to processing. The power management modes may include Fully-On, Conserve, Doze, Sleep, Deep-Sleep, Suspend, or the like.

BRIEF DESCRIPTIONS OF THE DRAWINGS

FIG. 3a is a block diagram illustrating the nap detect circuit and the prefetch detect circuit of the present invention.

FIG. 3b is a state machine diagram illustrating the operation of the overall circuit of FIG. 3a.

FIG. 3c is a logic diagram illustrating the nap detect circuit of FIG. 3a for programmable interrupt vectors.

FIG. 3d is a logic diagram illustrating the nap detect circuit of FIG. 3a for programmable interrupt numbers.

FIG. 3e is a logic diagram illustrating the prefetch detect circuit of FIG. 3a.

FIG. 3f is a timing diagram illustrating the timing of the prefetch detect state machine of FIG. 3a.

DETAILED DESCRIPTION OF THE INVENTION

The descriptions herein are by way of example only illustrating the preferred embodiment of the present invention. However, it should be appreciated that the method and apparatus of the present invention may be applied in a similar manner in other embodiments without departing from the spirit of the invention.

In general, the present invention conserves power in a personal computer system while allowing primary and secondary events to be detected and serviced. In the present invention, a plurality of power conservation modes may be progressively achieved in the absence of primary activity as respective mode timers expire. Upon detection of certain primary and secondary events, fall or partial wake-up may be triggered in order to perform necessary processing. If the system is already in a fully-on mode, and there is no primary or secondary activity, a nap mode may be triggered by the occurrence of programmed addresses indicative of system inactivity.

Figure 1:
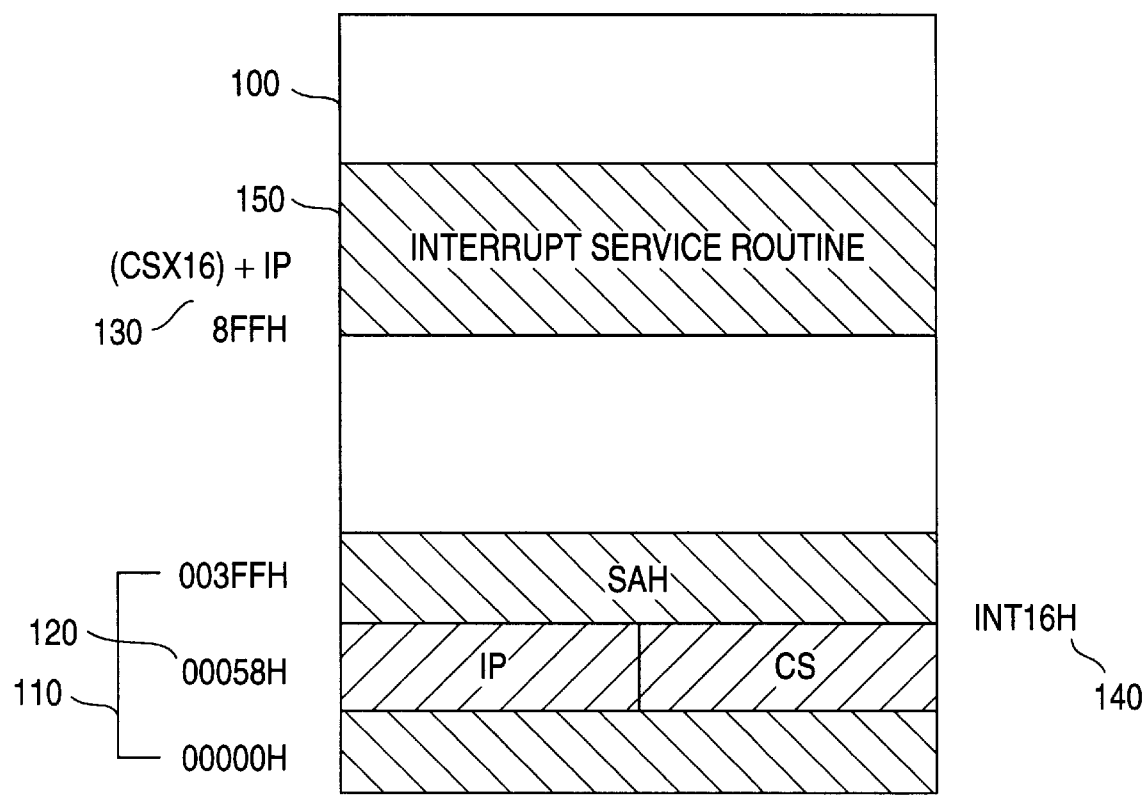
FIG. 1 is a diagram of system memory illustrating an interrupt vector table, an interrupt number entry, and an interrupt service routine.

FIG. 1 illustrates an example of interrupt vector table located in address space 110 in memory area 100. When the computer system of the present invention begins execution from power-on, ISR addresses for common software interrupts may be loaded into interrupt table addresses according to respective interrupt numbers. The ISR addresses corresponding to interrupt numbers may be loaded into address space 110 from 00000H to 003FFH by BIOS startup routines. Interrupt entry 140 may correspond to interrupt number INT16H. Interrupt entry address 120 for interrupt entry 140 may be 00058H. Interrupt entry address 120 may be calculated by multiplying an interrupt number, such as INT16H, by four. The number four may correspond to the number of bytes which form the ISR address in Code Segment (CS) plus Instruction Pointer (IP) form which may be commonly referred to as segment plus offset form. The two most significant bytes at interrupt address 120 may represent the CS value. The two least significant bytes may represent the IP value. For example, interrupt 140 corresponds to INT16H. Sixteen may be multiplied by four and converted into hexadecimal to calculate an interrupt table address 120 of 00058H. In the preferred embodiment, interrupt address 120 may contain a CS and IP value. In the present invention, an interrupt number or the CS and IP values of an interrupt vector may be programmable in registers and when the incoming address matches either of these, nap triggering may occur.

The four bytes of address 120 may comprise the CS and IP values used to form an address of ISR 150. ISR 150 may be executed as part of a CPU INT cycle whenever INT16H is identified as a present interrupt number. ISR 150 located at ISR address 130 may be calculated by multiplying the CS value read from the third and fourth bytes of interrupt address 120 by sixteen then adding the IP value obtained from the first and second bytes of interrupt address 120. As described earlier, ISR 150 may be loaded during startup at ISR address 130 by BIOS for common software interrupts. ISR 150 may also be loaded by an application or other software. Loading ISR 150 allows a custom ISR for a particular interrupt number to replace a standard ISR. Other ISRs may be loaded at other addresses and these ISR addresses loaded in the interrupt vector table in a corresponding interrupt number address by BIOS at startup, an application, or other software when hooking an unused interrupt or a fixed interrupt.

Figure 2:
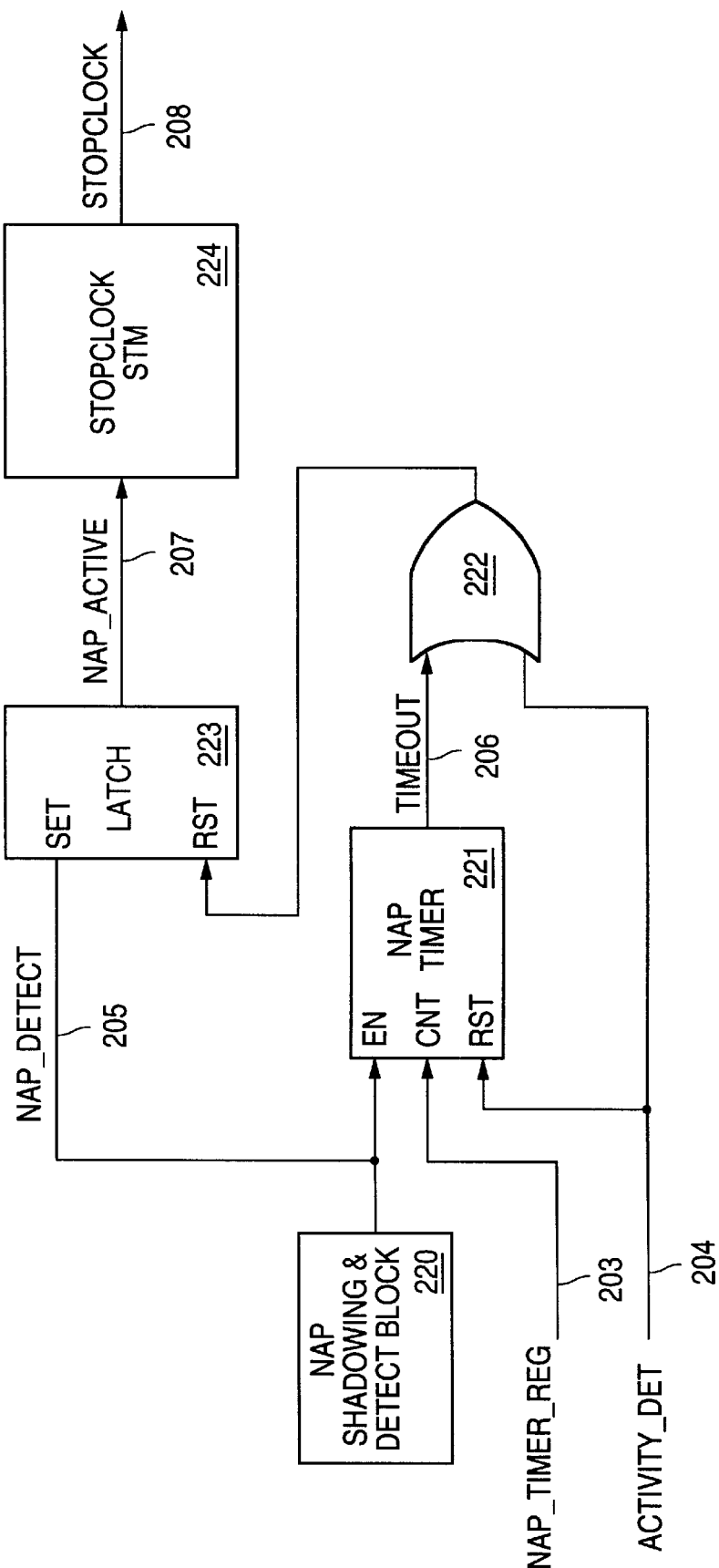
FIG. 2 is a logic diagram illustrating a portion of the overall circuit.

In FIG. 2, PROG_ADDR[31:3] signal 201 and ADDR [31:3] signal 202 may be inputs to the Nap Detect Block 220. The nap detect logic compares the two addresses and generates NAP_DETECT signal 205 upon a match. NAP_DETECT signal 205 is input to the SET pin of LATCH 223 and sets NAP_ACT signal 207 high. NAP_DETECT signal 205 is also input to the EN pin of the NAP_TIMER which starts counting to the value programmed in NAP_TIMER_REG register 203. Upon reaching the programmed count, TIMEOUT signal 206 goes high which resets the NAP_ACT signal 207. ACTIVITY_DET signal 204 indicates the presence of primary or secondary activity and can reset both the NAP_TIMER 221 and the NAP_ACT latch 223. The NAP_ACT signal 207 is input to the STOPCLOCK State Machine 224. While NAP_ACT is high, the STOPCLOCK signal 208 will be throttled if throttling is enabled or kept asserted if LESSTOP is enabled. In the present embodiment, thirty-two bit addressing is shown. It is possible however, for this invention to be embodied in systems with a larger addressing capability. When an interrupt vector address corresponding to one of the programmed addresses is decoded, ADDR_MATCH signal 206 may be generated.

There may be instances when a programmed address is detected and NAP_DET signal 205 is generated but because the programmed address is part of a prefetch, it may be undesirable to trigger a nap mode.

FIG. 3a is a block diagram illustrating the nap detect circuit and the prefetch detect circuit of the present invention. Prefetched addresses may be prefetched thirty-two bytes at a time in the preferred embodiment of the invention. However, an embodiment which prefetched more or less than thirty-two bytes and comprised a means for detecting whether programmed addresses were part of the prefetch line would not depart from the spirit and scope of the present invention. ADDR[31:3] signals 301 and PROG_ADDR [31:3] signals 398 may be input to address comparator 310 and ADDR[31:3] signals 301 may also be input to prefetch detect circuit 320. Since the least significant three address lines are not read, each difference of one between addresses represents differences of eight in the hexadecimal value of the decoded addresses. ADDR_MATCH signal 304 may be generated for addresses which match programmed addresses designated as nap triggers in the address comparator 310. PRFTCH_DET# signal 305 may be generated by prefetch detect circuit 320 when addresses are part of a prefetch line. Prefetch lines may exhibit a characteristic wherein present addresses may differ from previous addresses by a value of one indicating that the addresses were retrieved from sequential locations in memory. M/IO# signal 302 indicative of memory access and W/R# signal 303 indicative of whether memory is being read or written and D/C# signal 397 indicative of data or code cycle may be input to AND gate 330. AND gate 330 may generate NAP_DET signal 306 when M/IO# signal 302 is high, W/R# signal 303 is low, D/C# signal 397 is low and ADDR_MATCH signal 304 is high.

Figure 3E:
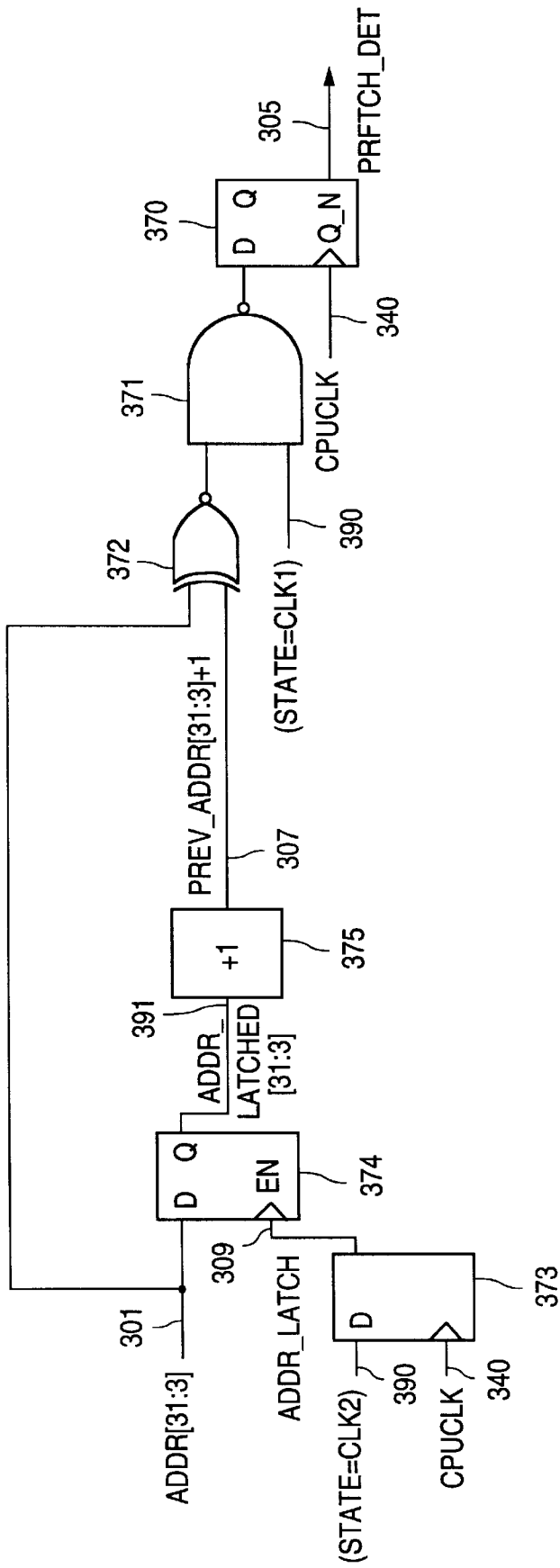

FIG. 3b is a state machine diagram illustrating the operation of prefetch detect circuit 320 of FIG. 3a which is illustrated in more detail in FIG. 3e. From IDLE state 00, 350, the occurrence of CPUCLK signal 340 indicative of a clock transition in conjunction with an active low ADS_N signal 308 indicative of a valid address may cause a state machine transition to CLK1 state 01, 370. In CLK1 state 01, 370, a present address match may be compared with the previous address or prefetched address. If the present address matches the value of one plus the previous address indicating a prefetched address, a signal indicative of prefetch detect may be asserted. From CLK1 state 01, 370, occurrence of CPUCLK signal 340 may cause a state machine transition to CLK2 state 10, 360. In CLK2 state 10, 360, the present address may be clocked into the prefetch detect circuit for use in subsequent state machine cycles. A final transition of CPUCLK signal 340 may cause the state machine to transition back to IDLE State 00, 350.

FIG. 3c is a logic diagram illustrating the nap detect circuit of FIG. 3a for programmable interrupt vectors. For programming a software interrupt for interrupt triggering, CS_REG[15:0] 312 and IP_REG[15:0] 313 may contain the CS and IP components of the software interrupt nap triggering address. CS_REG[15:0] 312 may be multiplied by 16 in multiplication block 314 to effect a shift left by 4 bits. A resulting 20 bit value may be input to adder logic 315 and PROG_ADDR[31:3] 311 may be output from adder logic 315 with bits [31:20] set to zeroes. ADDR[31:3] 301 is read from the address bus and input to gate 316 with PROG_ADDR[31:3] 311. If a match exists between ADDR [31:3] 301 and PROG_ADDR[31:3] 311, ADDR_MATCH signal 304 may be generated and input to logic gate 317 depicted here in the preferred embodiment as an AND gate. M/IO# signal 302 may also be input to logic gate 317 and indicates that memory is being accessed. D/C# signal 307 may also be input to logic gate 317 and indicates that code space within memory may be being accessed. W/R# signal 303 may also be input to logic gate 317 and indicates that memory is being read from. PRFTCH_DET# signal 305 may also be input to logic gate 317 and may be used to indicate that the present address is not part of a prefetch line. When all signals are present, NAP_DET signal 306 may be generated to control the application of a clock stopping signal.

FIG. 3d is a logic diagram illustrating the nap detect circuit of FIG. 3a for programmable interrupt numbers. For programming an interrupt source for nap triggering, PROG_INT_REG[7:0] 325 may be programmed with a value corresponding to an interrupt source and output to multiplication block 323. Multiplication block 323 multiplies the value in PROG_INT_REG[7:0] 325 by 4 to effect a shift left by 2 and outputs the value to adder 321. Dummy address 324 may be input to adder 321 to effect appending zeroes to the high order bits of the address and added with the product of PROG_INT_REG[7:0] 325 and the number 4 to form PROG_ADDR[31:2] 319 which may then be output to logic gate 316. ADDR[31:2] 322 may also be input to logic gate 316. If a match exists between ADDR[31:2] and PROG_ADDR[31:2], ADDR_MATCH signal 304 maybe generated and input to logic gate 318. M/IO# signal 302 may also be input to logic gate 318 and indicates that memory is being accessed. W/R# signal 303 may also be input to logic gate 318 and indicates that memory is being read from. PRFTCH_DET# signal 305 may also be input to logic gate 318 and may be used to indicate that the present address is not part of a prefetch line. When all signals are present, NAP_DET signal 306 may be generated to control the application of a clock stopping signal.

FIG. 3e is a logic diagram illustrating the prefetch detect circuit of FIG. 3a. ADDR[31:3] 301 is input to the D input of latch 374 and input to logic gate 372. CPUCLK 340 is input to the enable input of latch 373 and STATE 390 is input to the D input of latch 373. Flip-Flop 373 may generate ADDR_LATCH signal 309. ADDR_LATCH signal 309 may be input to the enable input of latch 374 to enable the present value of ADDR[31:3] 301 to be latched and output at the Q_N output of latch 374 as ADDR_LATCHED[31:3] 391. Once ADDR[31:3] 301 is latched and output from latch 374 as ADDR_LATCHED [31:3] 391, a delay of one clock cycle may then exist between the present value of ADDR [31:3] 301 and ADDR_LATCHED[31:3] 391 latched on the previous cycle. A value of 1 may be added to ADDR_LATCHED[31:3] 391 in block 375 and PREV_ADDR [31:3]+1 307 may be generated and output to logic gate 372. The logical product of PREV_ADDR[31:3]+1 307 and ADDR[31:3] 301 may be output to logic gate 371. STATE 390 may also be applied to logic gate 371 and the logical product applied to the D input of latch 370. When STATE 390 has a value of CLK1, and PREV_ADDR[31:3]+1 307 matches ADDR[31:3] 301, latch 370 may generate PRFTCH_DET# 305 indicating that address ADDR[31:3] 301 is part of a prefetch line. Because addresses fetched in prefetch lines are sequential, meaning one address differs from the next by a value of one, comparing whether present address ADDR[31:3] 301 matches PREV_ADDR[31:3]+1 307 may indicate that ADDR[31:3] 301 is a prefetched address. It may be undesirable to trigger a nap mode on a prefetched address which may be an interrupt address.

Figure 3F:
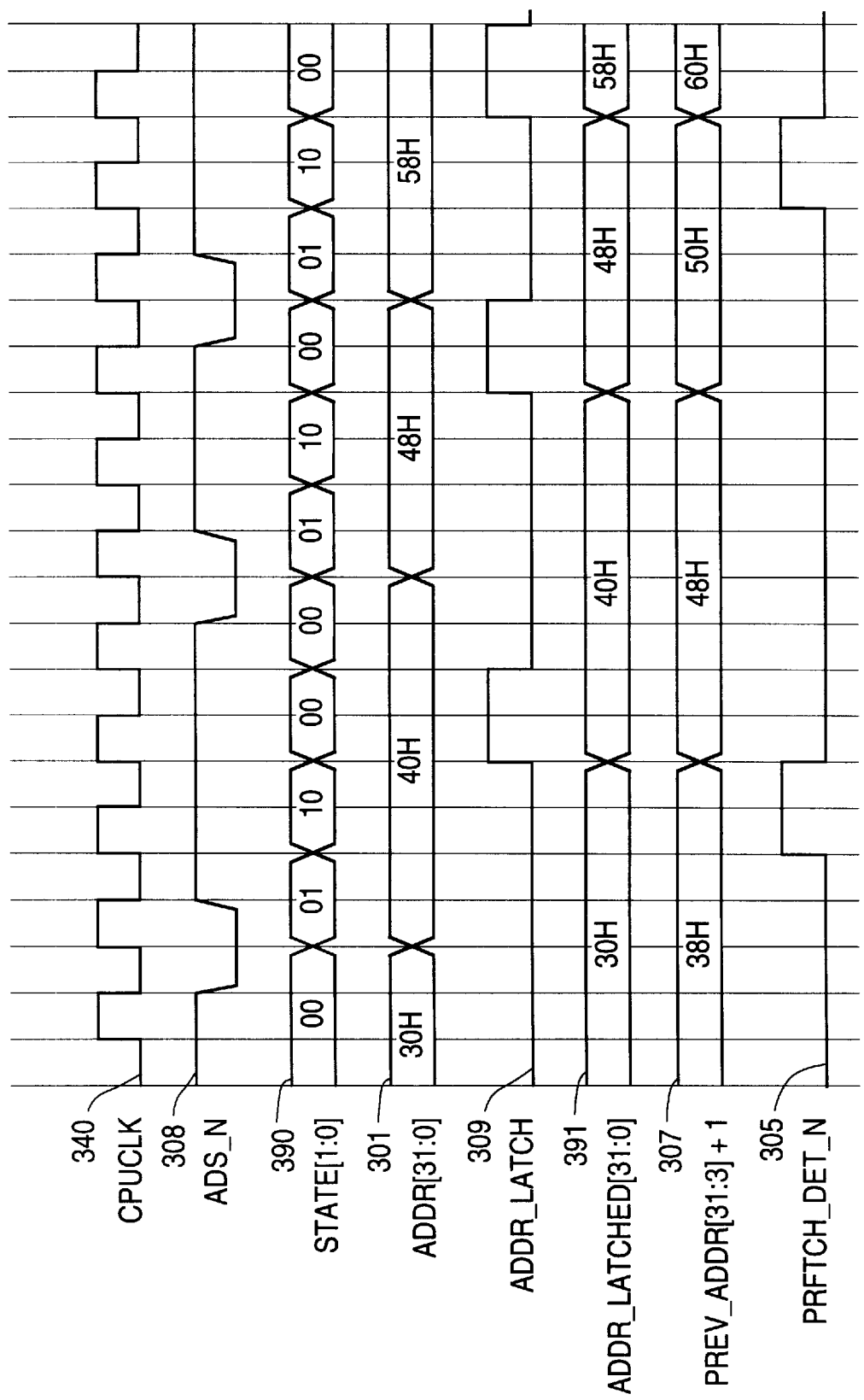

FIG. 3f is a timing diagram illustrating the timing of the prefetch detect state machine 320 illustrated in FIG. 3a. CPUCLK 340 may be used to synchronize circuit operation to processor operation. ADS_N signal 308 may be used to indicate that data on the system bus represent valid addresses. STATE 390 may be used to advance the operation of the prefetch detect state machine during subsequent cycles of CPUCLK 340. ADDR[31:0] 301 may represent a present address read from the system bus and used within prefetch detect circuit illustrated in FIG. 3a. ADDR_LATCH signal 309 may be used to latch present address ADDR[31:0] 301 into latch 321 of FIG. 3c. Once address ADDR_LATCHED[31:0] 391 is latched, a value of one is added. Address PREV_ADDR+1 307 represents address ADDR_LATCHED[31:0] 391 plus one and is compared to present address ADDR[31:0] 301. If ADDR_LATCHED 391 and present address ADDR[31:0] 301 matches then the processor is presumed to be prefetching and signal PRFTCH_DET# 305 is generated.

Figure 4:
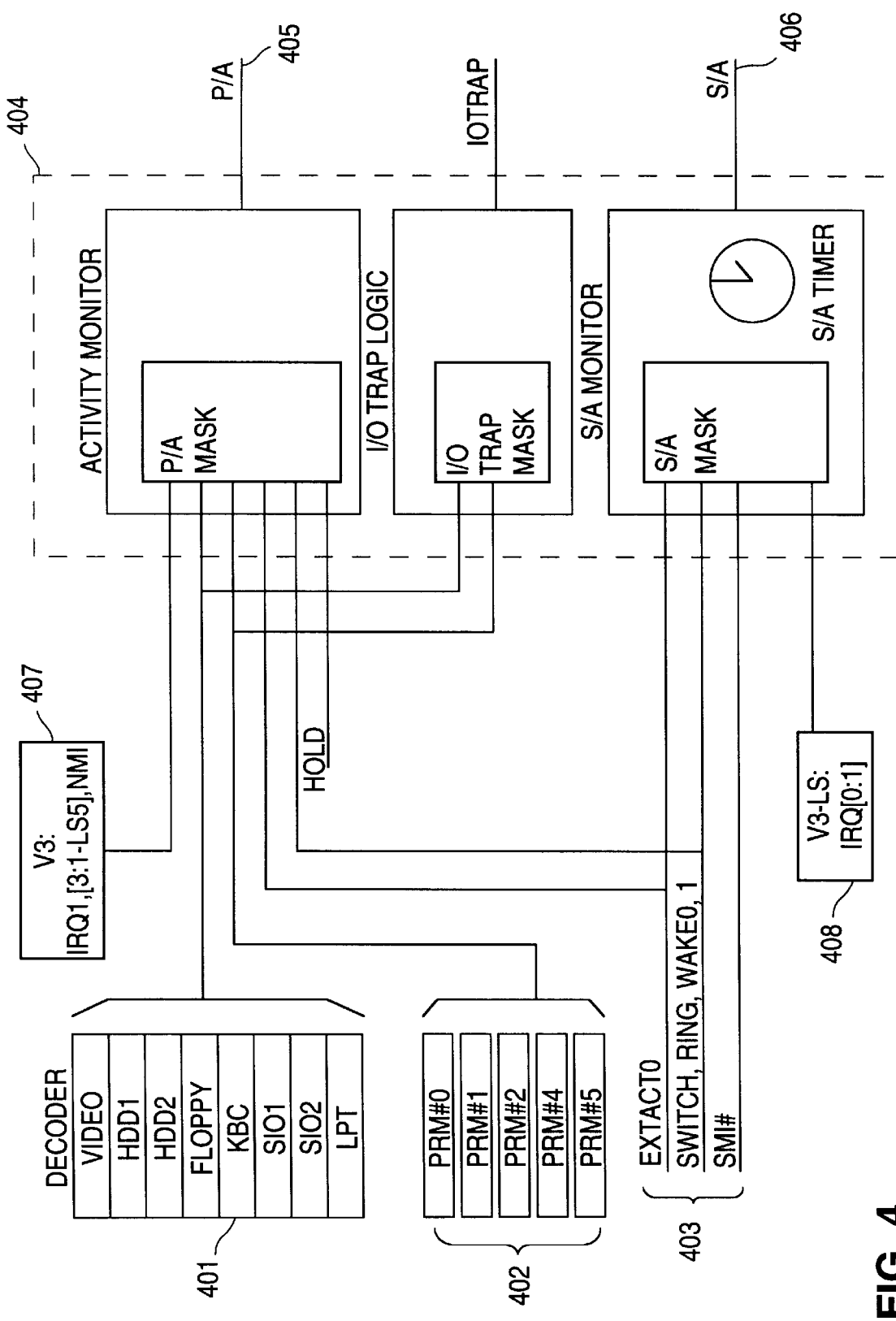
FIG. 4 is a block diagram illustrating primary and secondary activity generation.

In the preferred embodiment, primary and secondary activity signals, PACTIVITY 207 and SACTIVITY 208 of FIG. 2, may be used to inhibit nap triggering or end nap mode as illustrated in FIG. 2. Primary activity may be defined as important system activity where system resources may be being accessed. Unless masked, any primary activity may bring the system into fully awake mode. Primary activity may also reset power management timers. FIG. 4 illustrates primary activity register bank 402 coupled to activity monitoring circuit 404 and comprising PRM#0 through PRM#5. Any read or write accesses to addresses matching those stored in these registers in register bank 402 may trigger generation of primary activity, P/A signal 405. Accesses to VIDEO, hard drive or any devices shown in device register bank 401 may trigger generation of P/A signal 405 as may occurrence of any unmasked interrupt requests as in IRQ block 407.

Secondary activity may be defined as requiring a short amount of service time during various levels of inactivity. Unless masked, secondary activity may cause secondary events to be processed at full speed without throttling enabled. When a secondary event is serviced, the system may return to whatever mode the system was in prior to the occurrence of secondary activity. Secondary events 403 comprise EXACT0, SWITCH, RING, WAKE0 and 1, and SMI#s. These events are described in the *VESUVIUS-LS PCI System Controller Advance Data Book*, Version 0.6 March 1995, PICOPOWER a Cirrus Logic Company, p.54–67 incorporated herein by reference.

In addition to secondary events 403, secondary activity may be triggered by IRQ block 408. System Management Interrupts, SMI#s of secondary events 403 may allow activity to be programmed to trigger S/A signal 406 indicative of secondary activity. At least six device timers and at least three mode timers also may trigger S/A signal 406 through the generation of an SMI. Maximum flexibility may be achieved in the ability to program virtually any event as primary or secondary activity to suit power management goals. Once secondary events 403 or IRQ block 408 triggers secondary activity, S/A signal 406 may be generated.

Figure 5:
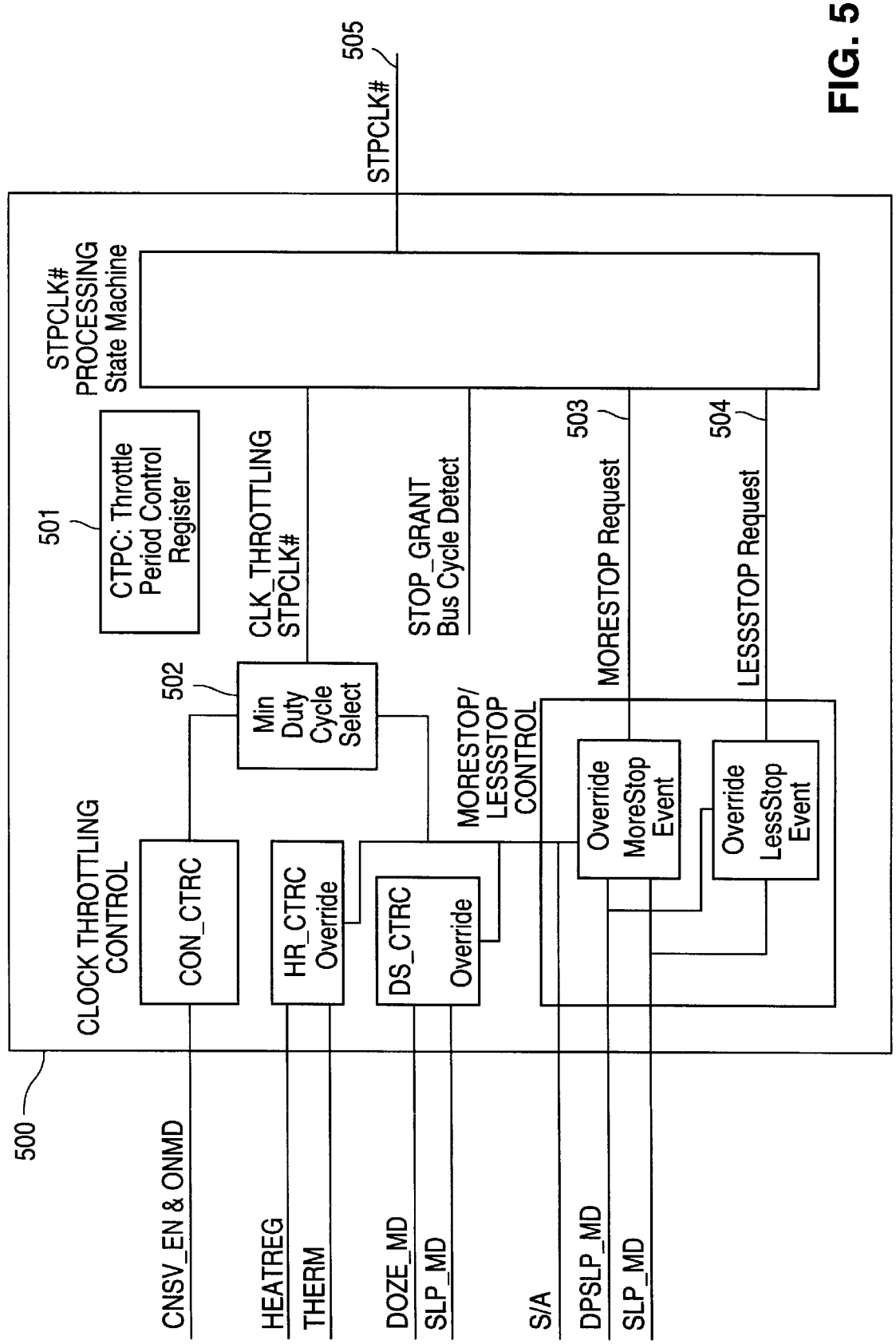
FIG. 5 is a block diagram illustrating throttling of the clock stopping signal and MORESTOP and LESSSTOP control.

In FIG. 5, stop clock control block 500 contains elements controlling generation of clock stopping signal STPCLK 505. Throttling period control register CTPC 501 stores a value corresponding to a throttling period. A throttling period may be a time interval during which clock stopping STPCLK 505 may be applied according to a duty cycle the value of which may be programmed in and read from a register. Duty cycle select block 502 controls the duty cycle of STPCLK 505 when it is applied during a throttling period.

MORESTOP request 503 and LESSSTOP request 504 may be input from applications or operating system software to indicate to the CPU that a higher or lower level of power conservation is desired. LESSSTOP request 405 may alter the level of sleep of the CPU by altering the duty cycle of the clock throttling circuit while the CPU clock continues to run. MORESTOP request 503 may control whether the CPU clock is stopped entirely during a throttling period or whenever STPCLK is asserted.

Unlike MORESTOP requests 503, the CPU clock may remain running during LESSSTOP requests 504. With the CPU clock running, the system may return instantly to processing when STPCLK 505 is removed. MORESTOP request 503 stops the CPU clock and upon removal of STPCLK, a latency period of up to 1 ms may be necessary to control CPU clock resynchronization and stabilization of the CPU PLL.

While the preferred embodiment and various alternative embodiments of the invention have been disclosed and described in detail herein, it may be apparent to those skilled in the art that various changes in form and detail may be made without departing from the spirit and scope of the invention.

For example, while the prefetch detect circuit illustrated herein as receiving a line of addresses thirty-two bytes long, the present invention could be practiced on systems with greater or lesser addressing capability. The use of programmed addresses while encompassing those software interrupts known to be indicative of inactivity, could be practiced on any fixed interrupt number or event controllable by application software or operating system software. Moreover, although the preferred embodiment is drawn to an integrated circuit, the present invention may be applied to a series of integrated circuits, or in other circuitry within a computer system without departing from the spirit and scope of the present invention.

We claim:

1. A circuit initiating power conservation upon detection of inactivity in a system, the circuit comprising:

a first register storing a first programmable address;

a detector for detecting access to a second address indicative of system inactivity; and a comparison block coupled to the detector and to the first register, the comparison block receiving and comparing the first programmable address with the second address, the comparison block generating a first signal if the first programmable address matches the second address, such that the first signal results in inhibition of a system clock and power conservation.

2. A method of conserving power in a computer system by controlling the application of a clock stopping signal in a system controller, said method comprising the steps of:

detecting a nap triggering event in a computer system and activating a nap signal by storing a value in a register corresponding to a programmable address, comparing the value with a present address, and generating a nap signal if the present address matches the value stored in said register;

inhibiting the nap signal during a processor prefetch cycle unless the present address is a first address in a prefetch cycle;

detecting primary and secondary activity and inhibiting the nap signal if said primary and secondary activity are present; and applying the clock stopping signal during a throttling period according to a programmable duty cycle while the nap signal is active.

3. The method of claim 2 wherein said step of inhibiting the nap signal during a processor prefetch cycle further comprises the steps of:

storing a value in a register corresponding to the previous address;

comparing with a present address; and generating a prefetch detect signal if the present address differs from the previous address by a value of one.

4. The method of claim 2 wherein said step of detecting primary and secondary activity and inhibiting said nap signal if said primary and secondary activity are present further comprises the steps of:

storing at least one value in a first at least one register corresponding to primary activity;

storing at least one value in a second at least one register corresponding to secondary activity;

detecting primary activity if said first at least one register value matches present activity;

detecting secondary activity if said second at least one register value matches present activity;

inhibiting said nap signal if primary activity is detected; and inhibiting said nap signal if secondary activity is detected.

5. The method of claim 4 wherein said step of detecting primary activity if said first at least one register value matched present activity further comprises:

storing a value in said first at least one register, said value comprising at least one of an address, and a hardware signal.

6. The method of claim 4 wherein said step of detecting secondary activity if said first at least one register value matched present activity further comprises:

storing a value in said first at least one register, said value comprising at least one of an address, and a hardware signal.

7. The method of claim 4 wherein said step of inhibiting said nap signal if primary activity is detected further comprises the steps of:

communicating a signal to a throttling circuit for controlling the application of a clock stopping signal, said signal for terminating the application of said clock stopping signal in a present power conservation mode.

8. The method of claim 4 wherein said step of inhibiting said nap signal if secondary activity is detected further comprises the step of:

communicating a signal to a throttling circuit for controlling the application of a clock stopping signal, said signal for suspending said application of said clock stopping signal in a present power conservation mode.

9. The method of claim 8 wherein said step of communicating a signal to a throttling circuit further comprises the step of:

restoring said application of said clock stopping signal in a previous power conservation mode if said secondary activity is no longer detected.

10. The method of claim 4 further comprising the steps of:

reading a programmable timeout value stored in a register, comparing the programmable timeout value with a NAP counter output, and generating a timeout signal if the programmable timeout value equals the NAP counter output.

11. A method of conserving power in a computer system by controlling the application of a clock stopping signal in a system controller, said method comprising the steps of:

detecting a nap triggering event in a computer system and activating a nap signal by storing a value in a register corresponding to a programmable address, comparing the value with a present address, and generating a nap signal if the present address matches the value stored in said register;

inhibiting the nap signal during a processor prefetch cycle unless a present address is a first address in a prefetch cycle, by storing a value in a register corresponding to the previous address, comparing with the present address, and generating a prefetch detect signal if the present address differs from the previous address by a value of one;

detecting primary and secondary activity and inhibiting the nap signal if said primary and secondary activity are present; and applying the clock stopping signal during a throttling period according to a programmable duty cycle while the nap signal is active.

12. The method of claim 11 wherein the step of detecting the nap triggering event and activating the nap signal further comprises the steps of:

storing a value in a register corresponding to a programmable address;

comparing the value with a present address; and generating a nap signal if the present address matches the value stored in said register.

13. The method of claim 11 wherein said step of detecting primary and secondary activity and inhibiting said nap signal if said primary and secondary activity are present further comprises the steps of:

storing at least one value in a first at least one register corresponding to primary activity;

storing at least one value in a second at least one register corresponding to secondary activity;

detecting primary activity if said first at least one register value matches present activity, detecting secondary activity if said second at least one register value matches present activity;

inhibiting said nap signal if primary activity is detected; and inhibiting said nap signal if secondary activity is detected.

14. The method of claim 13 wherein said step of detecting primary activity if said first at least one register value matched present activity further comprises:

storing a value in said first at least one register, said value comprising at least one of an address, and a hardware signal.

15. The method of claim 13 wherein said step of detecting secondary activity if said first at least one register value matched present activity further comprises:

storing a value in said first at least one register, said value comprising at least one of an address, and a hardware signal.

16. The method of claim 13 wherein said step of inhibiting said nap signal if primary activity is detected further comprises the steps of:

communicating a signal to a throttling circuit for controlling the application of a clock stopping signal, said signal for terminating the application of said clock stopping signal in a present power conservation mode.

17. The method of claim 13 wherein said step of inhibiting said nap signal if secondary activity is detected further comprises the step of:

communicating a signal to a throttling circuit for controlling the application of a clock stopping signal, said signal for suspending said application of said clock stopping signal in a present power conservation mode.

18. The method of claim 17 wherein said step of communicating a signal to a throttling circuit further comprises the step of:

restoring said application of said clock stopping signal in a previous power conservation mode if said secondary activity is no longer detected.

19. The method of claim 13 further comprising the steps of:

reading a programmable timeout value stored in a register, comparing the programmable timeout value with a NAP counter output, and generating a timeout signal if the programmable timeout value equals the NAP counter output.

20. A power conservation circuit comprising:

a nap triggering circuit receiving a first signal and generating a second signal when the first signal is indicative of system inactivity, the nap triggering circuit comprising a decoder receiving a first signal and translating the first signal into a first address, a first register receiving and storing a programmable address, and a comparison block coupled to the register and to the decoder, the comparison block receiving and comparing the programmable address with the first address and generating the second signal if the first address matches the programmable address;

a prefetch detect circuit receiving the first signal and generating a third signal when the first signal is the product of a prefetch cycle; and a throttling circuit coupled to the nap triggering circuit and to the prefetch detect circuit, the throttling circuit generating a clock stopping signal upon receipt of the second signal but not generating a clock stopping signal upon receipt of the third signal, such that communication of the clock stopping signal to a system clock results in inhibition of the system clock and power conservation.

21. A power conservation circuit comprising:

a nap triggering circuit receiving a first signal and generating a second signal when the first signal is indicative of system inactivity;

a prefetch detect circuit receiving the first signal and generating a third signal when the first signal is the product of a prefetch cycle, the prefetch detect circuit comprising a decoder receiving the first signal and translating the first signal into a present address, a register receiving and storing a prior address, a comparison block coupled to the register and to the decoder, the comparison block receiving and comparing the previous address with the present address, the comparison block generating the third signal if the previous address differs from the present address by a value of one; and a throttling circuit coupled to the nap triggering circuit and to the prefetch detect circuit, the throttling circuit generating a clock stopping signal upon receipt of the second signal but not generating a clock stopping signal upon receipt of the third signal, such that communication of the clock stopping signal to a system clock results in inhibition of the system clock and power conservation.

22. A power conservation circuit comprising:

a nap triggering circuit receiving a first signal and generating a second signal when the first signal is indicative of system inactivity;

a prefetch detect circuit receiving the first signal and generating a third signal when the first signal is the product of a prefetch cycle; and a throttling circuit coupled to the nap triggering circuit and to the prefetch detect circuit, the throttling circuit generating a clock stopping signal upon receipt of the second signal but not generating a clock stopping signal upon receipt of the third signal, such that communication of the clock stopping signal to a system clock results in inhibition of the system clock and power conservation, the throttling circuit comprising a first register storing a first value corresponding to a duration of a time period, a second register storing a second value corresponding to a duty cycle of the clock stopping signal, and a logic block coupled to the first and second registers, the logic block receiving the first and second values and the second signal, the logic block enabling application of the clock stopping signal in response to the second signal and according to the first and second values.

23. The power conservation circuit of claim 22, wherein the throttling circuit further comprises:
  a third register receiving a third signal indicative of a request to reduce power conservation in a CPU; and
  a second logic block altering the duty cycle of the clock stopping signal in response to the third signal.

* * * * *